(12) United States Patent
Hojo

(10) Patent No.: US 11,491,901 B2
(45) Date of Patent: Nov. 8, 2022

(54) VEHICLE SEAT HAVING PRESSURE RECEIVING MEMBER

(71) Applicant: TS TECH CO., LTD., Saitama (JP)

(72) Inventor: Kazunori Hojo, Tochigi (JP)

(73) Assignee: TS TECH CO., LTD., Saitama (JP)

( * ) Notice: Subject to any disclaimer, the term of this patent is extended or adjusted under 35 U.S.C. 154(b) by 0 days.

(21) Appl. No.: 17/337,550

(22) Filed: Jun. 3, 2021

(65) Prior Publication Data

US 2021/0284053 A1 Sep. 16, 2021

Related U.S. Application Data

(63) Continuation of application No. 16/858,881, filed on Apr. 27, 2020, now Pat. No. 11,027,637, which is a continuation of application No. 16/080,864, filed as application No. PCT/JP2017/008264 on Mar. 2, 2017, now Pat. No. 10,632,885.

(30) Foreign Application Priority Data

Mar. 3, 2016 (JP) ................................. 2016-041301

(51) Int. Cl.
 *B60N 2/70* (2006.01)
 *B60N 2/66* (2006.01)
 *B60N 2/64* (2006.01)
 *B60N 2/58* (2006.01)

(52) U.S. Cl.
 CPC ............. *B60N 2/7094* (2013.01); *B60N 2/58* (2013.01); *B60N 2/64* (2013.01); *B60N 2/66* (2013.01); *B60N 2/70* (2013.01)

(58) Field of Classification Search
 CPC .......... B60N 2/64; B60N 2/7094; B60N 2/66; B60N 2/70; B60N 2/646; B60N 2/643; A47C 7/18; A47C 7/35
 See application file for complete search history.

(56) References Cited

U.S. PATENT DOCUMENTS

| 4,558,905 A | 12/1985 | Natori |
| 5,105,491 A | 4/1992 | Yoshiyuki et al. |
| 7,585,030 B2 | 9/2009 | Galbreath et al. |
| 2009/0051206 A1 | 2/2009 | Fujita |

(Continued)

FOREIGN PATENT DOCUMENTS

| JP | S54-124707 U | 8/1979 |
| JP | S58-183151 U | 12/1983 |

(Continued)

OTHER PUBLICATIONS

Office Action issued in related application JP 2020-101157, dated Mar. 30, 2021, with machine generated English language translation, 10 pages.

*Primary Examiner* — Milton Nelson, Jr.
(74) *Attorney, Agent, or Firm* — Michael Best & Friedrich LLP

(57) ABSTRACT

To improve the seated feeling of an occupant in a seat having partially different hardness, a vehicle seat includes a seat frame, an S spring which is installed on the seat frame and receives a load of an occupant, and a seat back pad which has a plurality of regions respectively formed of different materials and is disposed between a skin material of the seat and the S spring. The S spring is disposed at a position facing a boundary portion which is provided in the seat back pad and is the plurality of regions respectively formed of different materials.

6 Claims, 14 Drawing Sheets

(56) References Cited

U.S. PATENT DOCUMENTS

| | | |
|---|---|---|
| 2011/0260508 A1 | 10/2011 | Laframboise et al. |
| 2013/0175838 A1 | 7/2013 | Oshima et al. |
| 2013/0214583 A1 | 8/2013 | Uramichi et al. |
| 2015/0093546 A1 | 4/2015 | Ishii et al. |
| 2015/0246627 A1 | 9/2015 | Shimizu |
| 2017/0368972 A1 | 12/2017 | Fujikake et al. |

FOREIGN PATENT DOCUMENTS

| | | |
|---|---|---|
| JP | S59-070548 U | 5/1984 |
| JP | H04-048860 U | 4/1992 |
| JP | H11-113688 A | 4/1999 |
| JP | 2001-070083 A | 3/2001 |
| JP | 2005-035516 A | 2/2005 |
| JP | 2008-284275 A | 11/2008 |
| JP | 4300377 B2 | 7/2009 |
| JP | 2012-176330 A | 9/2012 |
| JP | 2015-091628 A | 5/2015 |
| WO | 2012/043807 A1 | 4/2012 |
| WO | 2014/054553 A1 | 4/2014 |

VEHICLE SEAT HAVING PRESSURE RECEIVING MEMBER

CROSS REFERENCE TO RELATED APPLICATIONS

This application is a continuation of U.S. patent application Ser. No. 16/858,881, filed Apr. 27, 2020, which is a continuation of U.S. patent application Ser. No. 16/080,864, filed Aug. 29, 2018, now U.S. Pat. No. 10,632,885, which is a National Stage Entry application of PCT Application No. PCT/JP2017/008264, filed Mar. 2, 2017, which claims the priority benefit of Japanese Patent Application No. JP 2016-041301, filed Mar. 3, 2016, the entire contents of each of which being incorporated herein by reference.

BACKGROUND

The present disclosure relates to a vehicle seat with seat pads having partially different hardness.

There is known a vehicle seat in which the hardness of a seat pad is set to be different in accordance with a portion supporting an occupant. For example, Japanese Patent Publication JP 4300377 B2 discloses a vehicle seat of which a side support portion is formed by a foam having hardness different at the inside and the outside of the side support portion.

SUMMARY

However, since the hardness changes largely at a boundary portion between different foams in the seat pad, an uncomfortable feeling is generated at the boundary portion and thus the seating feeling of the seat is deteriorated.

The present disclosure has been made in view of the above-described problem and an object of the present disclosure is to provide a vehicle seat capable of improving the seating feeling of an occupant in a seat having partially different hardness.

The above-described problem is solved by a vehicle seat including: a seat frame; a pressure receiving member that is installed on the seat frame and receives a load of an occupant; and a seat pad which has a plurality of regions respectively formed of different materials and is disposed between a skin material of the seat and the pressure receiving member, wherein the pressure receiving member is disposed at a position facing a boundary portion of the plurality of regions.

According to the above-described vehicle seat, since the boundary portion in a region formed of a different material in the seat pad is supported by the pressure receiving member, it is possible to reduce an uncomfortable feeling of the occupant at the boundary portion. Accordingly, it is possible to improve the seating feeling of the occupant in a seat of which hardness is partially changed.

Further, in the above-described vehicle seat, the seat frame may be a seat back frame forming a skeleton of a seat back forming a backrest surface, the pressure receiving member may be installed on the seat back frame in a seat width direction, the skin material may cover the seat back, the seat pad may be a seat back pad disposed between the skin material and the pressure receiving member, the boundary portion may be provided along the seat width direction, and the boundary portion may overlap at least a part of the pressure receiving member in an up and down direction of the seat. With such a configuration, even when a plurality of regions formed of different materials are provided in the seat back pad disposed inside the seat back corresponding to the backrest surface of the occupant, it is possible to reduce an uncomfortable feeling of the occupant at the boundary portion of the regions.

Further, in the above-described vehicle seat, a front end portion of the boundary portion on a front side of the seat and a rear end portion of the boundary portion on a rear side of the seat may be located at different positions in the up and down direction of the seat. With such a configuration, it is possible to reduce a change in hardness at the boundary portion of the regions respectively formed of different materials in the seat back pad and the periphery thereof. Accordingly, it is possible to reduce an uncomfortable feeling of the occupant at the boundary portion.

Further, in the above-described vehicle seat, a connection surface between the front end portion and the rear end portion may be formed in a stepped structure. With such a configuration, the hardness can be changed stepwisely at the boundary portion and the periphery thereof. Accordingly, since it is possible to suppress an abrupt change in hardness at the boundary portion and the periphery thereof, it is possible to reduce an uncomfortable feeling at the boundary portion.

Further, in the above-described vehicle seat, the connection surface between the front end portion and the rear end portion may be formed in a gradient structure. With such a configuration, the hardness can be changed with a gradient at the boundary portion and the periphery thereof. Accordingly, since the hardness can be changed smoothly at the boundary portion and the periphery of the boundary portion, it is possible to reduce an uncomfortable feeling at the boundary portion.

Further, in the above-described vehicle seat, the pressure receiving member may be set as a first pressure receiving member, the vehicle seat may further include a second pressure receiving member that is installed on the seat back frame in the seat width direction and is provided below the first pressure receiving member, and one of the front end portion and the rear end portion may be located between the first pressure receiving member and the second pressure receiving member and the other thereof may be located at a height overlapping the first pressure receiving member. With such a configuration, since the end portion of the boundary portion on the rear side of the seat in relation to the end portion thereof on the front side of the seat is strongly supported by the pressure receiving member, the hardness is changed smoothly at the boundary portion and thus an uncomfortable feeling can be reduced.

Further, in the above-described vehicle seat, a hardness of a region below the boundary portion in the seat back pad may be higher than a hardness of a region thereabove. With such a configuration, since the lower portion of the upper body of the occupant is stably supported, the posture of the occupant can be easily maintained. Further, since the upper portion of the upper body of the occupant is softly supported, a seating feeling becomes satisfactory.

Further, in the above-described vehicle seat, the seat frame may be a seat cushion frame forming a skeleton of a seat cushion forming a seating surface, the pressure receiving member may be installed on the seat cushion frame in a seat width direction, the skin material may cover the seat cushion, the seat pad may be a seat cushion pad disposed between the skin material and the pressure receiving member, the boundary portion may be provided along the seat width direction, and the boundary portion may overlap at least a part of the pressure receiving member in a front to back direction of the seat. With such a configuration, even when a plurality of regions formed of different materials are provided in the seat cushion pad disposed inside the seat cushion corresponding to the occupant seating surface, it is possible to reduce an uncomfortable feeling of the occupant at the boundary portion of the regions.

Further, in the above-described vehicle seat, a skin material suspending portion may be attached to a groove formed in the boundary portion. The skin material can be suspended at the position of the boundary portion. Accordingly, since the slack of the skin material at the boundary portion is prevented, it is possible to reduce an uncomfortable feeling at the boundary portion.

Further, in the above-described vehicle seat, the boundary portion may be a compatible portion in which the materials of the plurality of regions are compatible. With such a configuration, it is possible to widen the load input surface at the boundary portion. Accordingly, it is possible to reduce an uncomfortable feeling of the occupant at the boundary portion.

According to the present disclosure, it is possible to reduce an uncomfortable feeling of the occupant at the boundary portion of a region respectively formed of different materials.

According to an aspect of the present disclosure, even when a plurality of regions formed of different materials are provided in the seat back pad, it is possible to reduce an uncomfortable feeling of the occupant at the boundary portion of the regions.

According to an aspect of the present disclosure, it is possible to reduce a change in hardness at the boundary portion of the regions respectively formed of different materials and the periphery thereof.

According to an aspect of the present disclosure, an abrupt change in hardness at the boundary portion and the periphery thereof is suppressed, it is possible to reduce an uncomfortable feeling at the boundary portion.

According to an aspect of the present disclosure, since the hardness smoothly changes at the boundary portion and the periphery of the boundary portion, it is possible to reduce an uncomfortable feeling at the boundary portion.

According to an aspect of the present disclosure, it is possible to reduce an uncomfortable feeling by smoothly changing the hardness at the boundary portion.

According to an aspect of the present disclosure, it is possible to easily maintain the posture of the occupant and to obtain a satisfactory seating feeling.

According to an aspect of the present disclosure, even when a plurality of regions formed of different materials are provided in the seat cushion pad, it is possible to reduce an uncomfortable feeling of the occupant at the boundary portion of the regions.

According to an aspect of the present disclosure, since the slack of the skin material at the boundary portion is prevented, it is possible to reduce an uncomfortable feeling at the boundary portion.

According to an aspect of the present disclosure, since the load input surface at the boundary portion is widened, it is possible to reduce an uncomfortable feeling of the occupant at the boundary portion.

BRIEF DESCRIPTION OF DRAWINGS

Various embodiments of the invention are illustrated in the drawings, in which.

DETAILED DESCRIPTION

Hereinafter, a vehicle seat S according to an embodiment (hereinafter, the present embodiment) of the present disclosure is described with reference to FIGS. 1 to 14. Additionally, the embodiment to be described below is merely used to help the understanding of the present disclosure and does not limit the present disclosure. That is, the present disclosure can be modified and improved without departing from the gist thereof and the equivalents thereof are, of course, included in the present disclosure. Above all, an outline of each of drawings is described.

Figure 1:
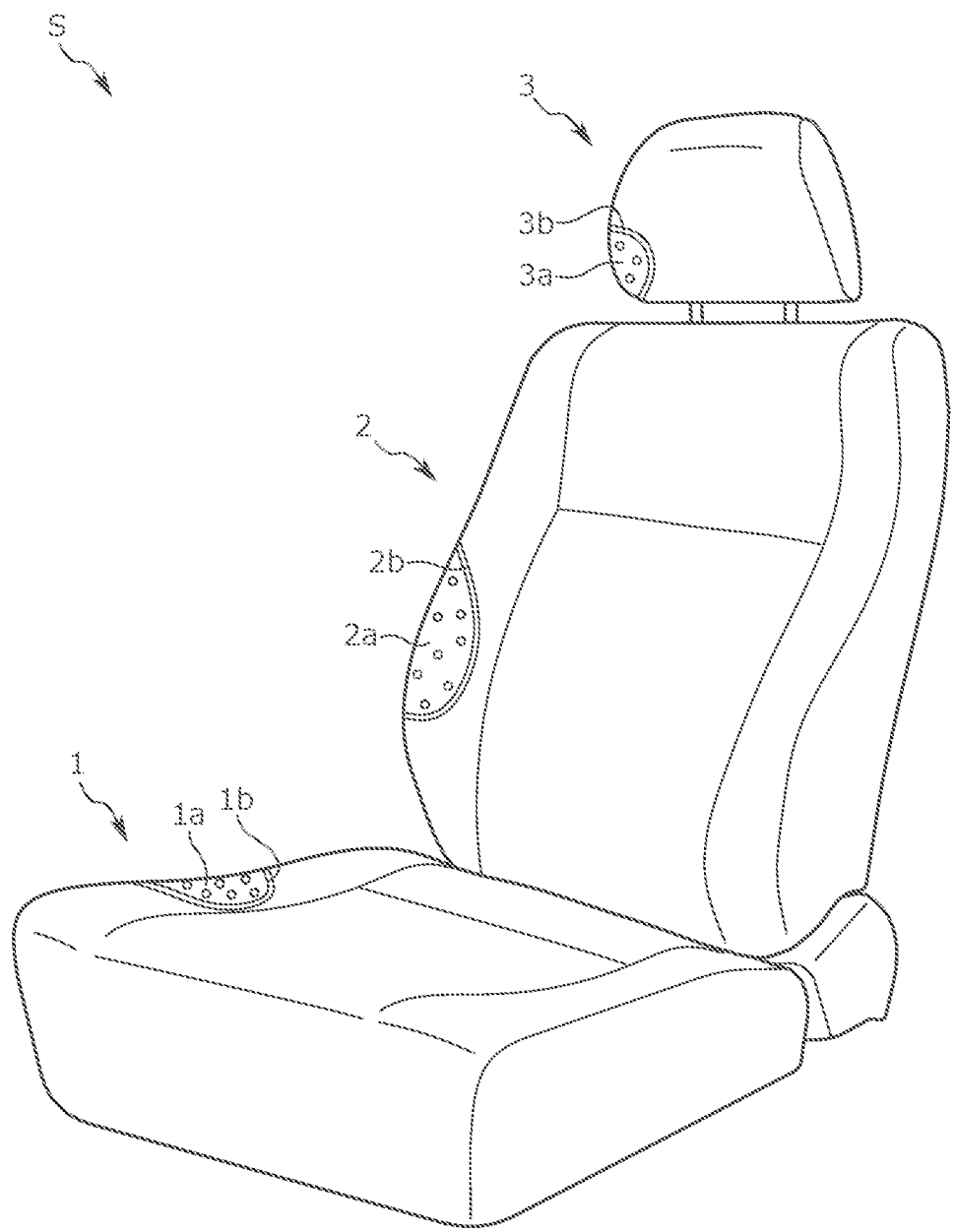
FIG. 1 is a perspective view of a vehicle seat according to the present embodiment.
Figure 2:
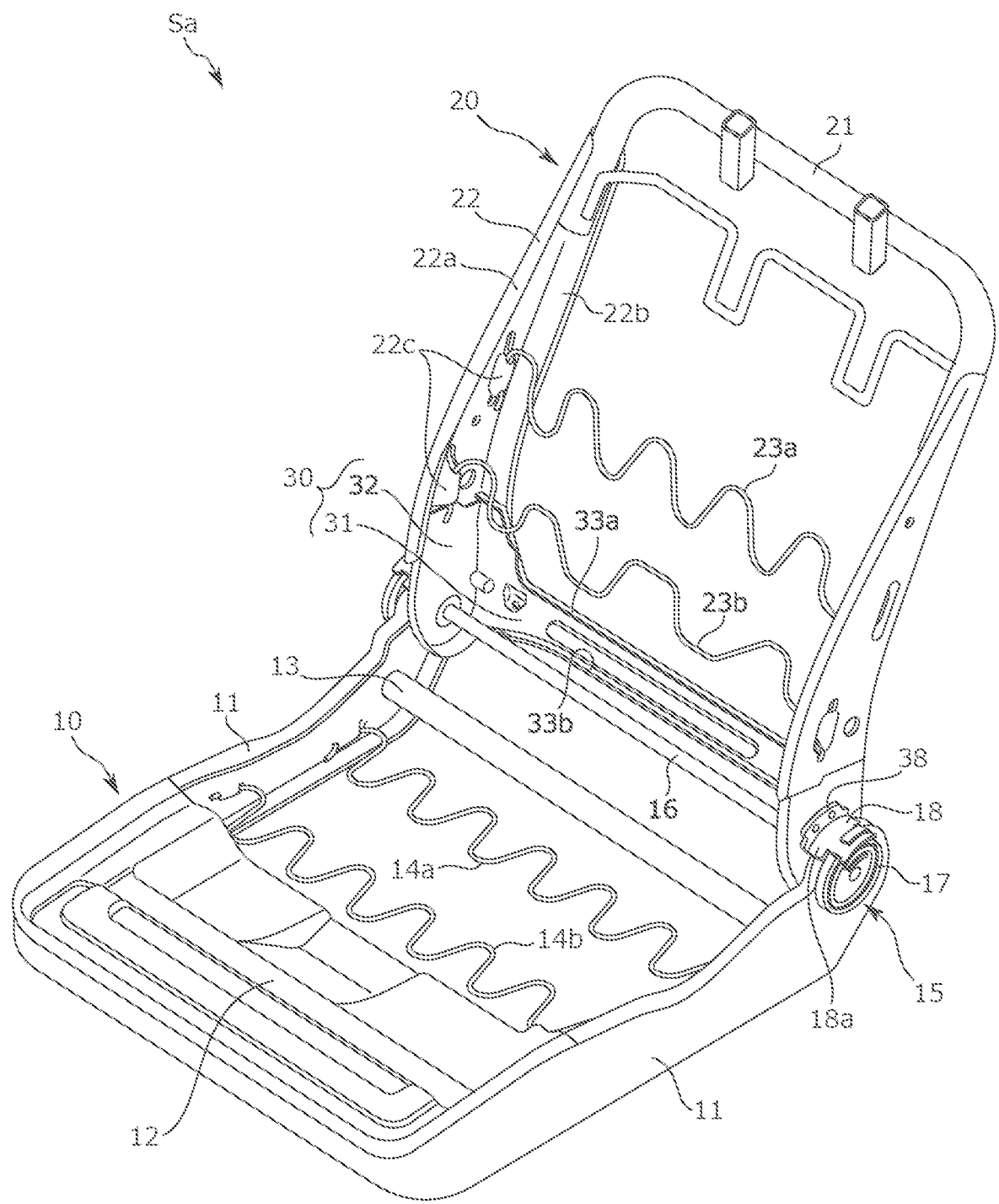
FIG. 2 is a perspective view of a seat frame according to the present embodiment.

FIG. 1 is a perspective view of a vehicle seat S according to the present embodiment and FIG. 2 is a perspective view of a seat frame Sa forming a skeleton of the vehicle seat S.

Figure 3:
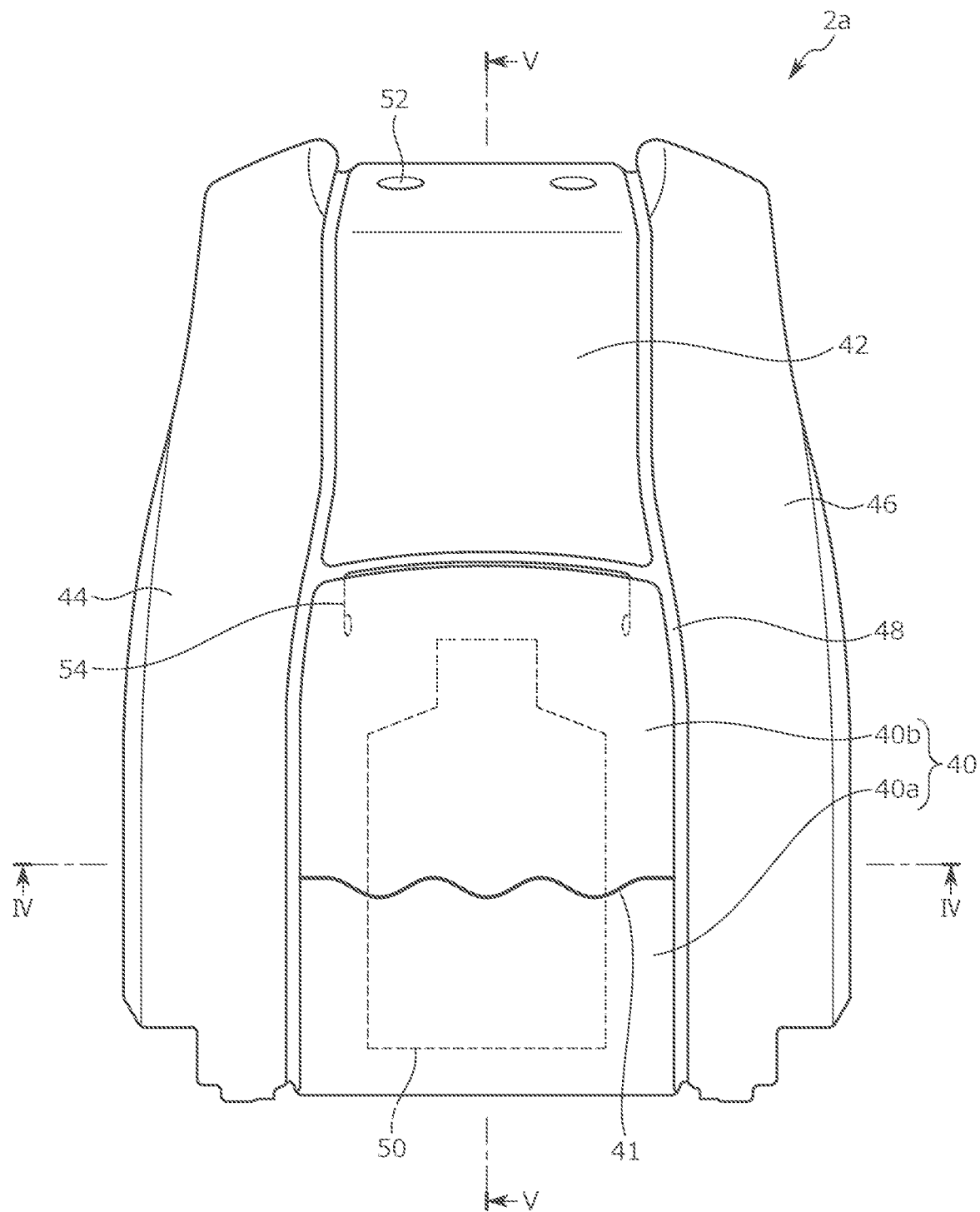
FIG. 3 is a front view of a seat back pad.
Figure 4:
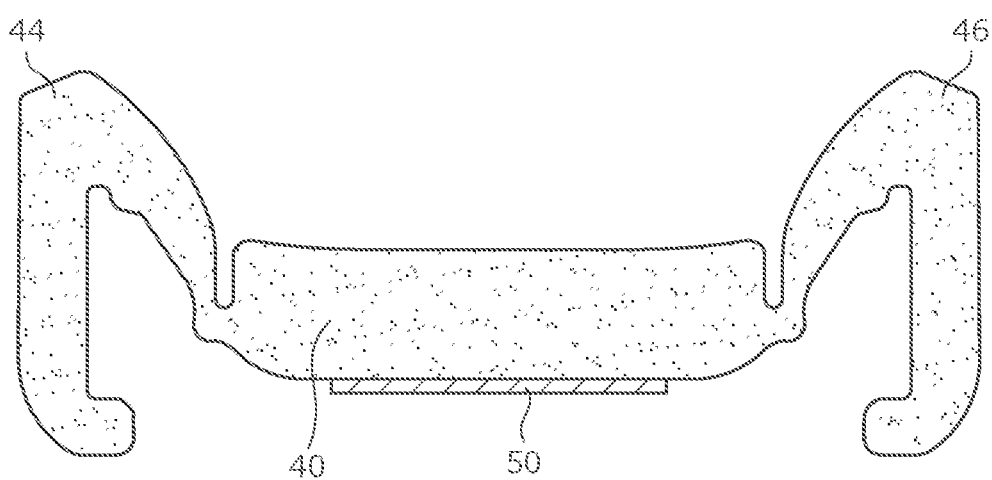
FIG. 4 is a cross-sectional view taken along the line IV-IV of the seat back pad.
Figure 5:
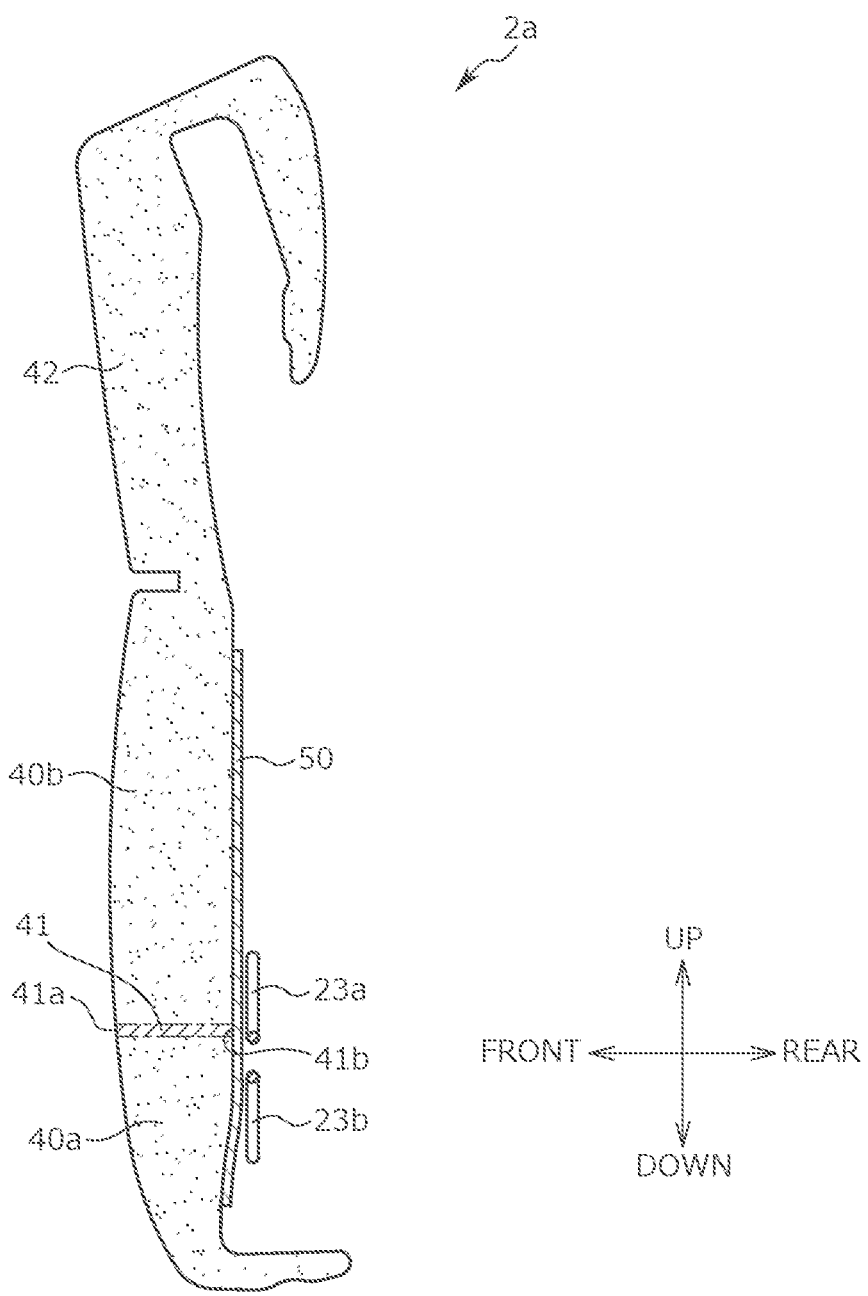
FIG. 5 is a cross-sectional view taken along the line V-V of the seat back pad.

FIG. 3 is a front view of a seat back pad 2*a* which is a cushion material of the seat back 2, FIG. 4 is a cross-sectional view taken along the line IV-IV of the seat back pad 2*a*, and FIG. 5 is a cross-sectional view taken along the line V-V of the seat back pad 2*a*.

Figure 6:
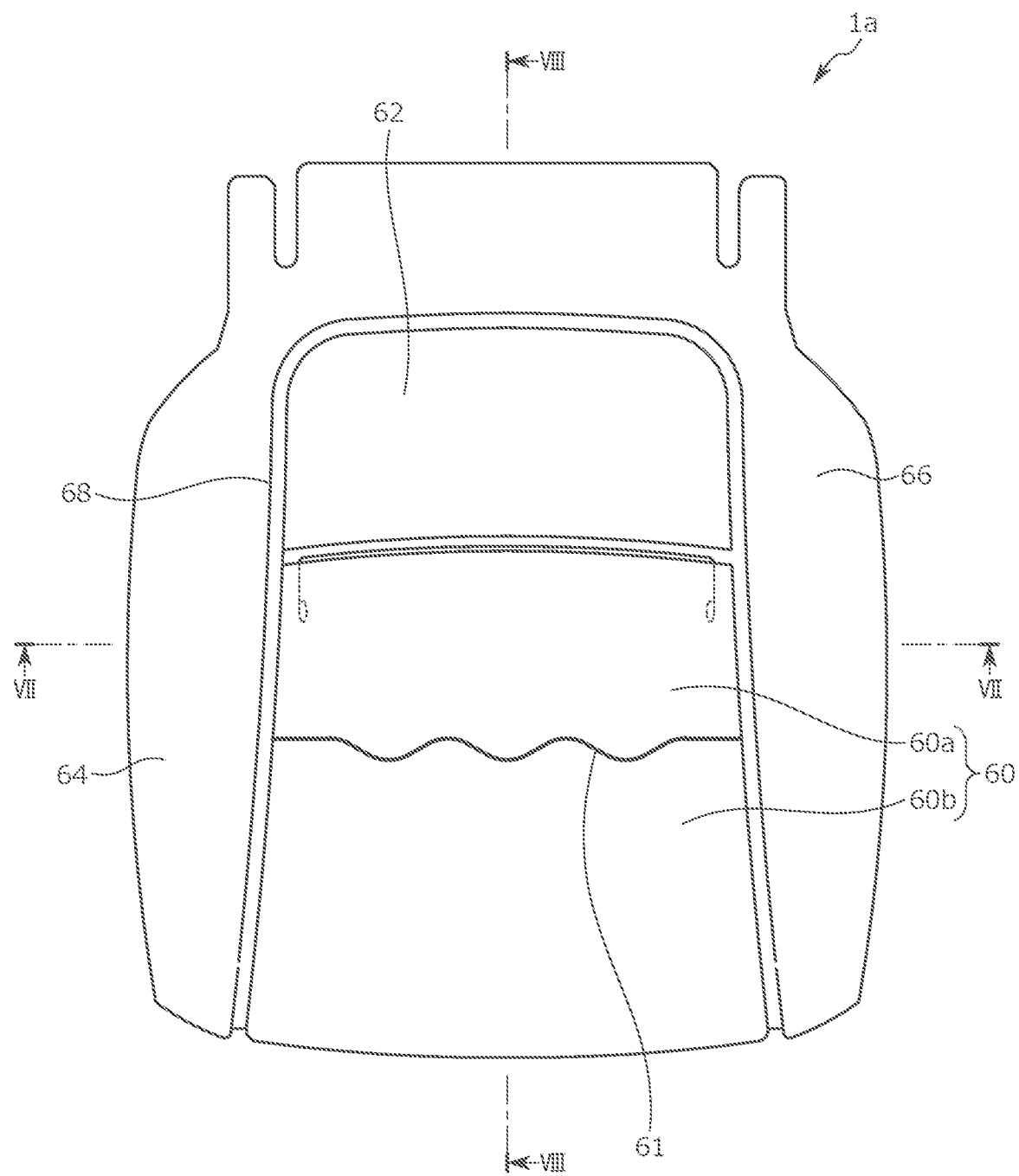
FIG. 6 is a top view of a seat cushion pad.
Figure 7:
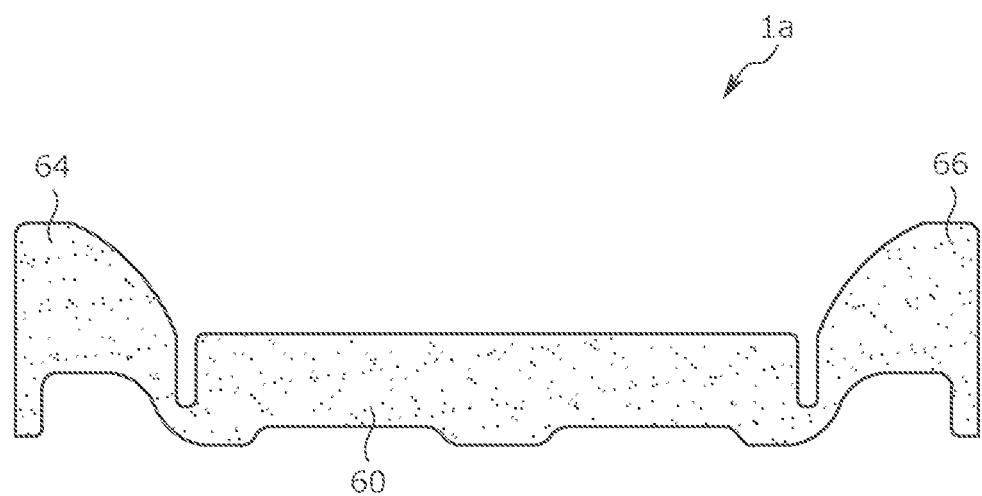
FIG. 7 is a cross-sectional view taken along the line VII-VII of the seat cushion pad.
Figure 8:
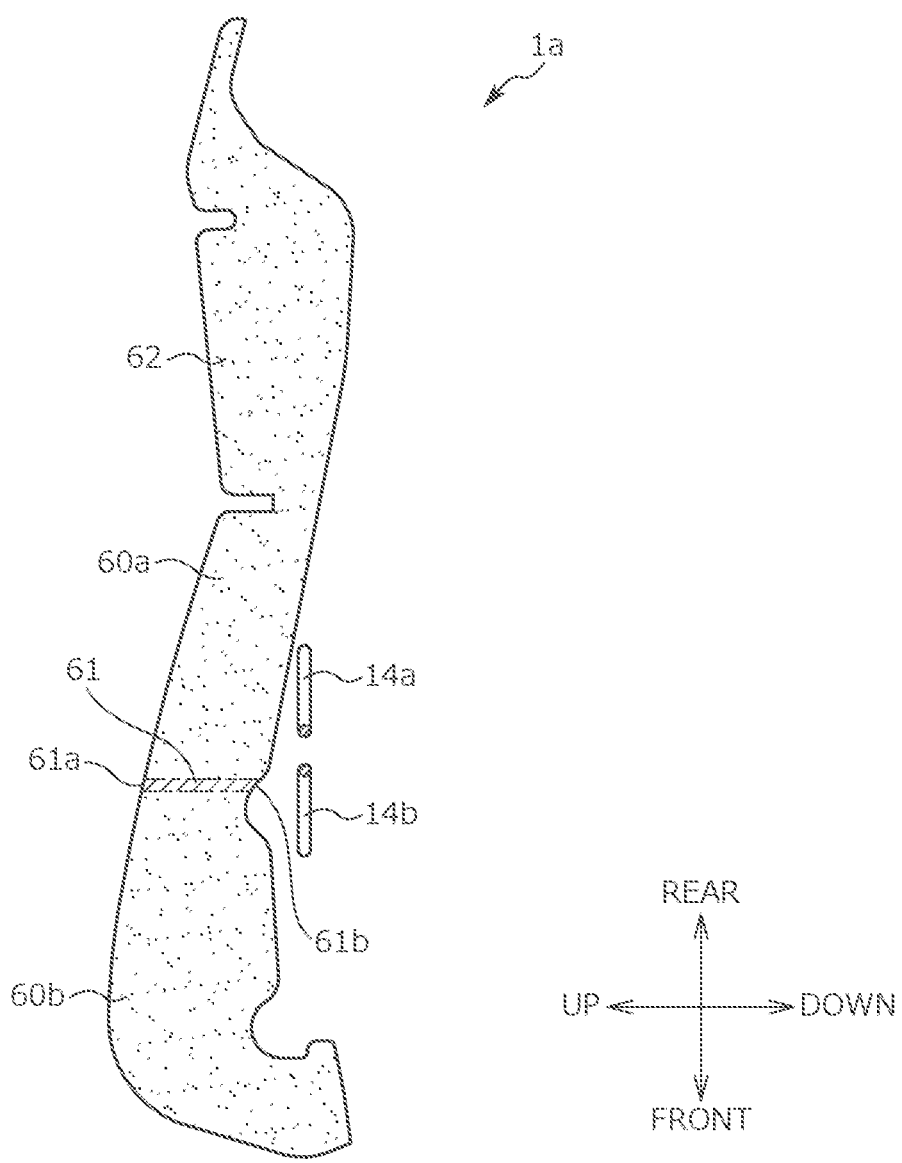
FIG. 8 is a cross-sectional view taken along the line VIII-VIII of the seat cushion pad.

FIG. 6 is a top view of a seat cushion pad 1*a* which is a cushion material of the seat cushion 1, FIG. 7 is a cross-sectional view taken along the line VII-VII of the seat cushion pad 1*a*, and FIG. 8 is a cross-sectional view taken along the line VIII-VIII of the seat cushion pad 1*a*.

Then, FIGS. 9 to 14 are respectively cross-sectional views taken along lines V-V of the seat back pads 2*a* according to the first to sixth modified examples.

Configuration of Vehicle Seat S and Seat Frame Sa

First of all, configurations of the vehicle seat S and the seat frame Sa according to the present embodiment is described with reference to FIGS. 1 and 2.

The vehicle seat S of the present embodiment mainly includes, as illustrated in FIG. 1, the seat cushion 1, the seat back 2 disposed on the upper surface side of the seat cushion 1, and a headrest 3 disposed on the upper surface side of the seat back 2. The seat frame Sa which forms the skeleton illustrated in FIG. 2 is disposed inside the vehicle seat S.

Further, in the description below, the "front to back direction" means the front to back direction when viewed from a seated occupant on the vehicle seat S and means a direction aligned to the vehicle traveling direction. The "seat width direction" means the horizontal width direction of the vehicle seat S and is aligned to the right and left direction when viewed from the seated occupant on the vehicle seat S. Further, the "up and down direction" means the height direction of the vehicle seat S and is aligned to the up and down direction when the vehicle seat S is viewed from the front side.

The seat cushion 1 is a seating portion which supports an occupant from below. The seat cushion 1 has a configuration in which the seat cushion pad 1a is placed on a cushion frame 10 serving as a skeleton illustrated in FIG. 2 and the seat cushion pad 1a is covered with a skin 1b.

The seat back 2 is a backrest portion which supports a back of the occupant from the rear side. The seat back 2 has a configuration in which the seat back pad 2a is placed on the seat back frame 20 forming the skeleton illustrated in FIG. 2 and the seat back pad 2a is covered with a skin 2b.

The headrest 3 is a head portion which supports a head of the occupant from the rear side. The headrest 3 has a configuration in which a headrest pad 3a is placed on a pillar (not illustrated) which is a core material and the headrest pad 3a is covered with a skin 3b.

The cushion frame 10 is formed as a substantially rectangular frame which is the skeleton of the seat cushion 1. The cushion frame 10 includes, as illustrated in FIG. 2, a cushion side frame 11 which is disposed on each of the right and left sides, a pan frame 12 which is a plate-shaped frame installed on the front upper surface of each of the cushion side frames 11, a frame connection pipe 13 which is a connection member installed in the vicinity of the rear end portion of each of the cushion side frames 11, and S springs 14a and 14b which are connected to the substantially center portions of each of the cushion side frames 11 in the front to back direction.

The S spring 14a and the S spring 14b are pressure receiving members that support the occupant sitting on the seat cushion 1 from below. The S spring 14a and the S spring 14b located on the front side of the seat in relation to the S spring 14a are respectively installed and held on the cushion side frames 11 on both sides.

The cushion side frame 11 is formed as a sheet metal member extending in the front to back direction. The left cushion side frame 11 and the right cushion side frame 11 are separated from each other in the right and left direction in parallel to each other.

As illustrated in FIG. 2, a reclining mechanism 15 which rotatably connects the seat back 2 to the seat cushion 1 is provided between the cushion side frame 11 and the seat back frame 20.

The reclining mechanism 15 includes a connection shaft 16 which is a rotation shaft of the reclining mechanism 15, a spiral spring 17 which urges the seat back frame 20 in an upright state, and a spring locking member 18 that locks an extension end portion of the spiral spring 17.

The connection shaft 16 is formed as a pipe member having a substantially circular cross-sectional shape and connecting both right and left end portions of the cushion side frame 11 and the seat back frame 20.

The connection shaft 16 is connected while being fitted through shaft penetration holes (not illustrated) provided at both right and left lower end portions of the seat back frame 20 and shaft insertion holes (not illustrated) provided at both right and left rear end portions of the cushion side frames 11.

The spiral spring 17 is formed as a spiral wire member and is provided at the rear end portions of the right and left outer surfaces of the cushion side frames 11. One end portion of the spiral spring 17 is hooked to the spring locking member 18 to be fixed to the right and left outer lower end portions of the seat back frame 20. The other end portion of the spiral spring 17 is fixed while being hooked to spring locking portions (not illustrated) provided on the right and left outer surfaces of the cushion side frames 11.

The spring locking member 18 is formed in a substantially L-shape by bending a sheet metal member, the upper end portion of the spring locking member 18 is fixed to the seat back frame 20, a bent portion 18a bent outward in the right and left direction is provided at the lower end portion, and one end of the spiral spring 17 is hooked to the bent portion 18a.

Additionally, an operation lever (not illustrated) is attached to the outside of the cushion side frame 11. Accordingly, a mechanism is obtained in which the connection shaft 16 rotates by the operation of the operation lever and the seat back 2 rotates with respect to the seat cushion 1.

The seat back frame 20 is formed as a substantially rectangular frame as illustrated in FIG. 2. The seat back frame 20 includes an upper frame 21 which is a hollow cylindrical body formed in a substantially inverted U-shape on the upper side, right and left side frames 22 which are disposed to be connected to the upper frame 21 on the right and left sides, S springs 23a and 23b which are installed on the substantially center portions of the inner surfaces of the side frames 22, and a lower frame 30 which is installed on the lower end portions of the inner surfaces of the side frames 22. Additionally, the side frame 22 and the lower frame 30 may be formed integrally with each other.

The right and left side frames 22 are formed in a substantially U-shape by bending a sheet metal member inward in the right and left direction. The right and left side frames 22 extend in the up and down direction and are separated from each other in the right and left direction in parallel to each other. The right and left side frames 22 are formed to gradually extend forward from the upper side to the lower side and each side frame includes a front bent portion 22a which is bent inward in the right and left direction from the front end portion and a rear bent portion 22b which is bent inward in the right and left direction from the rear end portion.

A concave portion 22c which is recessed inward in the right and left direction is provided on the right and left inner surfaces of the right and left side frames 22 and the concave portion 22c has a penetration hole penetrating in the up and down direction.

Each of the S spring 23a and the S spring 23b is a pressure receiving member that supports a back and a waist of the occupant from the rear side. In the present embodiment, the pressure receiving member is formed as the metal elastic member, but the present disclosure is not limited thereto. For example, the pressure receiving member may be formed of resin, woven fabric, or the like and not be elastically deformed. Further, the S spring 23a and the S spring 23b located below the S spring 23a are connected to the right and left side frames 22 while both right and left end portions thereof are inserted and hooked to the penetration holes of the concave portions 22c.

The lower frame 30 is formed in a substantially U-shape by bending a sheet metal member forward. The lower frame 30 includes, as illustrated in FIG. 2, a frame main body portion 31 which extends in the right and left direction and a frame bent portion 32 which is formed by bending both right and left ends.

The frame bent portion 32 is disposed to be in contact with the inner surface of the side frame 22. The upper end portion of the frame bent portion 32 and the lower end portion of the side frame 22 are fixed by welding.

The frame bent portion 32 has a shaft penetration hole (not illustrated) which is formed to penetrate in the right and left direction and the connection shaft 16 is connected while being fitted through the shaft penetration hole. The spring locking member 18 is fixed to the outer surface of the frame bent portion 32 by a fastening bolt 38.

As illustrated in FIG. 2, the frame main body portion 31 includes an upper end flange portion 33a and a lower end flange portion 33b which protrude forward. The upper end flange portion 33a and the lower end flange portion 33b are respectively provided at the upper end portion and the lower end portion of the frame main body portion 31 and extend in the right and left direction.

Next, configurations of the seat back pad 2a and the seat cushion pad 1a is described with reference to FIGS. 3 to 8.

Configuration of Seat back Pad 2a

First, a detail of the seat back pad 2a is described with reference to FIGS. 3 to 5. As illustrated in FIG. 3, the seat back pad 2a includes a lower cushion region 40 which supports a lower portion of an upper body of the occupant, an upper cushion region 42 which supports an upper portion of the upper body of the occupant, a right cushion region 44 which supports a right portion of the upper body of the occupant, and a left cushion region 46 which supports a left portion of the upper body of the occupant. The above-described regions are defined by a groove portion 48. Further, the upper surface of the upper cushion region 42 has a headrest penetration hole 52 through which a pillar of the headrest 3 is inserted. Then, a suspending wire 54 for suspending the skin 2b on the seat front surface side is buried in the seat back pad 2a.

The lower cushion region 40 includes a first lower cushion region 40a and a second lower cushion region 40b which are respectively formed of different materials. A boundary between the first lower cushion region 40a and the second lower cushion region 40b is set as a boundary portion 41. Here, the first lower cushion region 40a is located above the second lower cushion region 40b. For example, the first lower cushion region 40a is a lumbar support region which supports a lumbar spine of the occupant and in this case, the boundary portion 41 is located above the lumbar support region.

Further, the first lower cushion region 40a and the second lower cushion region 40b may be members formed of the same material molded to have different performances such as hardness, density, and rebound resilience at the time of foam molding, may be members respectively formed of the materials having different performances such as hardness, density, and rebound resilience at the time of foam molding, or may be a three-dimensional mesh-shaped elastic body or the like having a different structure. For example, the first lower cushion region 40a and the second lower cushion region 40b may be respectively molded from different synthetic resin materials such as polyurethane (PUR), polystyrene (PS), polyethylene (PE), and polypropylene (PP).

Further, both materials may be selected so that the hardness of the first lower cushion region 40a is higher than the hardness of the second lower cushion region 40b. As an example of this case, the first lower cushion region 40a may be molded by PP (polypropylene) bead foam and the second lower cushion region 40b may be molded by polyurethane foam. In this way, since the hardness of the first lower cushion region 40a is set to be higher than the hardness of the second lower cushion region 40b, the region supporting the lumbar spine of the occupant may be set to be hard and the region supporting the upper body above the lumbar spine of the occupant may be set to be soft. Accordingly, since the occupant can be supported in a stable posture and the upper portion of the upper body near a shoulder of the occupant sinks into the seat, a burden is reduced and hence a seating feeling can be improved.

Additionally, the boundary portion 41 between the first lower cushion region 40a and the second lower cushion region 40b is formed in a wavy shape when the seat is viewed from the front side in the example illustrated in FIG. 3, but the present disclosure is not limited thereto. For example, the boundary portion may be formed in a curved shape, a straight shape, or a complex shape (for example, a polygonal line) formed by two or more different curves and straight lines.

Further, the boundary portion 41 between the first lower cushion region 40a and the second lower cushion region 40b may be a joint which is formed such that the first lower cushion region 40a and the second lower cushion region 40b are respectively molded and are bonded to each other by adhering. Further, the boundary portion 41 may be an impregnation layer formed when one layer penetrates the other layer at the time of molding the second lower cushion region 40b with the first lower cushion region 40a. Furthermore, the boundary portion 41 may be a compatible portion in which the molding material of the first lower cushion region 40a and the molding material of the second lower cushion region 40b are mixed with each other and are hardened.

Further, as illustrated in FIGS. 3 to 5, a press felt 50 adheres to the rear surfaces (the seat rear surfaces) of the first lower cushion region 40a and the second lower cushion region 40b. The press felt 50 is disposed at a position overlapping the boundary portion 41 in the up and down direction of the seat. Accordingly, the strength in the periphery of the boundary portion 41 can be improved.

Additionally, the upper cushion region 42, the right cushion region 44, and the left cushion region 46 may be molded from the same material as that of the first lower cushion region 40a or the second lower cushion region 40b or may be molded from a material different from any one of them.

Here, a positional relationship between the boundary portion 41 and the S springs 23a and 23b serving as the pressure receiving member is described with reference to FIG. 5. As illustrated in FIG. 5, the boundary portion 41 and the S spring 23a are disposed at a position at least partially overlapping each other in the up and down direction of the seat. Here, a front end portion 41a is an end portion of the boundary portion 41 on the front side of the seat and a rear end portion 41b is an end portion of the boundary portion 41 on the rear side of the seat. In the example illustrated in FIG. 5, the front end portion 41a and the rear end portion 41b are disposed at the substantially same position in the up and down direction of the seat and both of the front end portion 41a and the rear end portion 41b are disposed at a position overlapping at least a part of the S spring 23a in the up and down direction of the seat.

Additionally, in the example illustrated in FIG. 5, the boundary portion 41 is disposed at a position overlapping the S spring 23a in the up and down direction of the seat, but the boundary portion 41 may be disposed at a position overlapping the S spring 23b in the up and down direction of the seat. Further, a different configuration example of the arrangement of the boundary portion 41 and the S springs 23a and 23b is described below.

As illustrated in FIG. 5, since the boundary portion 41 and the S spring 23a are disposed at a position facing each other in the up and down direction of the seat, the boundary portion 41 that receives the load of the occupant can be supported by the S spring 23a. Then, since the boundary portion 41 is a portion which changes from the hardness of the first lower cushion region 40a to the hardness of the second lower cushion region 40b, it is possible to reduce a change in hardness in the periphery of the boundary portion 41 by supporting that portion by the S spring 23a as described above.

Configuration of Seat Cushion Pad 1a

Next, a detail of the seat cushion pad 1a is described with reference to FIGS. 6 to 8. As illustrated in FIGS. 6 and 7, the seat cushion pad 1a includes a front cushion region 60 which supports a thigh of the occupant, a rear cushion region 62 which supports buttocks of the occupant, a right cushion region 64 which supports a right leg of the occupant, and a left cushion region 66 which supports a left leg of the occupant and each region is defined by a groove portion 68.

The front cushion region 60 includes a first front cushion region 60a and a second front cushion region 60b which are respectively molded from different materials and a boundary between the first front cushion region 60a and the second front cushion region 60b is set as a boundary portion 61. Here, the second front cushion region 60b is located on the front side in relation to the first front cushion region 60a. For example, the first front cushion region 60a is an ischial tuberosity support region which supports an ischial tuberosity of the occupant and in this case, the boundary portion 61 is located in front of the ischial tuberosity support region.

Further, the first front cushion region 60a and the second front cushion region 60b may be members formed of the same material molded to have different performances such as hardness, density, and rebound resilience at the time of foam molding, may be members respectively formed of the materials having different performances such as hardness, density, and rebound resilience at the time of foam molding, or may be a three-dimensional mesh-shaped elastic body or the like having a different structure. For example, the first front cushion region 60a and the second front cushion region 60b may be respectively molded from different synthetic resin materials such as polyurethane (PUR), polystyrene (PS), polyethylene (PE), and polypropylene (PP).

Further, both materials may be selected so that the hardness of the first front cushion region 60a is higher than the hardness of the second front cushion region 60b. As an example of this case, the first front cushion region 60a may be molded by PP (polypropylene) bead foam and the second front cushion region 60b may be molded by polyurethane foam. In this way, since the hardness of the first front cushion region 60a is set to be higher than the hardness of the second front cushion region 60b, the region supporting the ischial tuberosity of the occupant may be set to be hard and the region supporting the front side of the ischial tuberosity of the occupant may be set to be soft. Accordingly, since the occupant can be supported in a stable posture and the front side of the thigh of the occupant sinks into the seat, a burden is reduced and hence a seating feeling can be improved.

Additionally, the boundary portion 61 between the first front cushion region 60a and the second front cushion region 60b is formed in a wavy shape when the seat is viewed from above in the example illustrated in FIG. 6, but the present disclosure is not limited thereto. For example, the boundary portion may be formed in a curved shape, a straight shape, or a complex shape (for example, a polygonal line) formed by two or more different curves and straight lines.

Further, the boundary portion 61 between the first front cushion region 60a and the second front cushion region 60b may be a joint which is formed such that the first front cushion region 60a and the second front cushion region 60b are respectively molded and are bonded to each other by adhering. Further, the boundary portion 61 may be an impregnation layer formed when one layer penetrates the other layer at the time of molding the second front cushion region 60b with the first front cushion region 60a. Furthermore, the boundary portion 61 may be a compatible portion in which the molding material of the first front cushion region 60a and the molding material of the second front cushion region 60b are mixed with each other and are hardened.

Additionally, the rear cushion region 62, the right cushion region 64, and the left cushion region 66 may be molded from the same material as that of the first front cushion region 60a or the second front cushion region 60b or may be molded from a material different from any one of them.

Here, a positional relationship between the boundary portion 61 and the S springs 14a and 14b serving as the pressure receiving member is described with reference to FIG. 8. As illustrated in FIG. 8, the boundary portion 61 and the S spring 14b are disposed at a position at least partially overlapping each other in the front to back direction of the seat. Here, the upper end portion 61a is an end portion of the boundary portion 41 on the upper side of the seat and the lower end portion 61b is an end portion of the boundary portion 61 on the lower side of the seat. In the example illustrated in FIG. 8, the upper end portion 61a and the lower end portion 61b are located at the substantially same position in the front to back direction of the seat and both of the upper end portion 61a and the lower end portion 61b are disposed at a position overlapping at least a part of the S spring 14b in the front to back direction of the seat.

Additionally, in the example illustrated in FIG. 8, the boundary portion 61 is disposed at a position overlapping the S spring 14b in the front to back direction of the seat, but the boundary portion 61 may be disposed at a position overlapping the S spring 14a in the front to back direction of the seat.

As illustrated in FIG. 8, since the boundary portion 61 and the S spring 14b are disposed at a position overlapping each other in the front to back direction of the seat, the boundary portion 61 that receives the load of the occupant can be supported by the S spring 14b. Then, since the boundary portion 61 is a portion which changes from the hardness of the first front cushion region 60a to the hardness of the second front cushion region 60b, it is possible to reduce a change in hardness in the periphery of the boundary portion 61 by supporting that portion by the S spring 14b as described above.

Modified Examples

Next, modified examples of the seat back pad 2a is described with reference to FIGS. 9 to 14. Additionally, in the example illustrated in FIGS. 9 to 14, the configuration of the boundary portion 41 of the seat back pad 2a is different from that of the above-described seat back pad 2a, but the other points are common. Hereinafter, only the different points is described and the common points is omitted.

Figure 9:
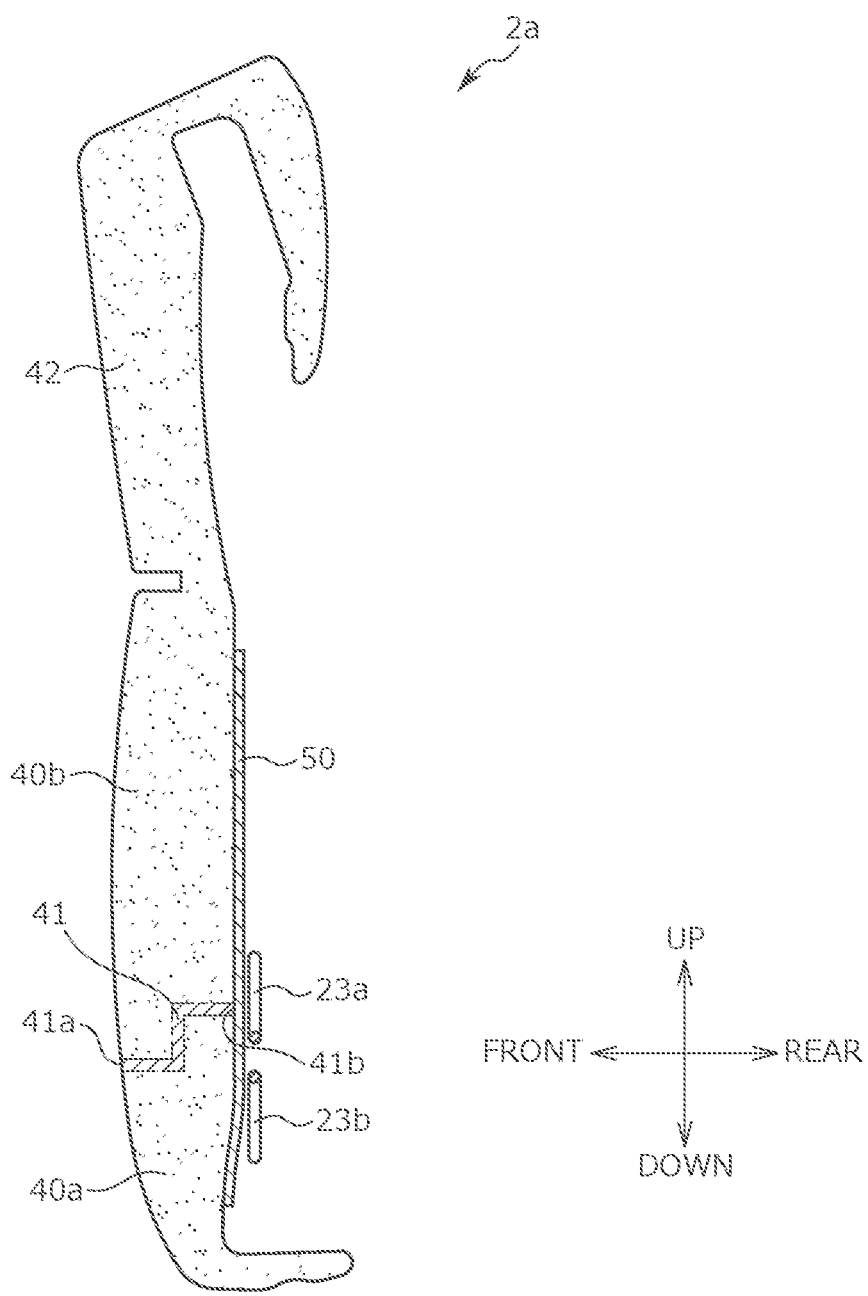
FIG. 9 is a cross-sectional view taken along the line V-V of a seat back pad according to a first modified example.

FIG. 9 is a cross-sectional view taken along the line V-V of the seat back pad 2a according to a first modified example. As illustrated in FIG. 9, in the seat back pad 2a according to the first modified example, the front end portion 41a and the rear end portion 41b of the boundary portion 41 are located at different heights in the up and down direction of the seat and a connection surface between the front end portion 41a and the rear end portion 41b is formed as a stepped structure. In other words, the front end portion 41a and the rear end portion 41b are connected to each other in a stepped (stepwise) structure. Additionally, the front end portion 41a is located between the S spring 23a and the S spring 23b in the up and down direction of the seat and the rear end portion 41b is located at a position overlapping the S spring 23a in the up and down direction of the seat. Further, the boundary portion 41 illustrated in FIG. 9 may be formed as an impregnation layer or a joint.

In this way, the boundary portion 41 is formed as a stepped structure in which the heights of the front end portion 41a and the rear end portion 41b in the up and down direction of the seat are different and one end portion (in this example, the rear end portion 41b) faces the S spring 23a. Accordingly, since a change in hardness between the boundary portion 41 and the periphery thereof in the seat back pad 2a is stepwise, it is possible to suppress an abrupt change in hardness between the boundary portion and the periphery thereof. Accordingly, it is possible to reduce a change in hardness in the periphery of the boundary portion 41.

Figure 10:
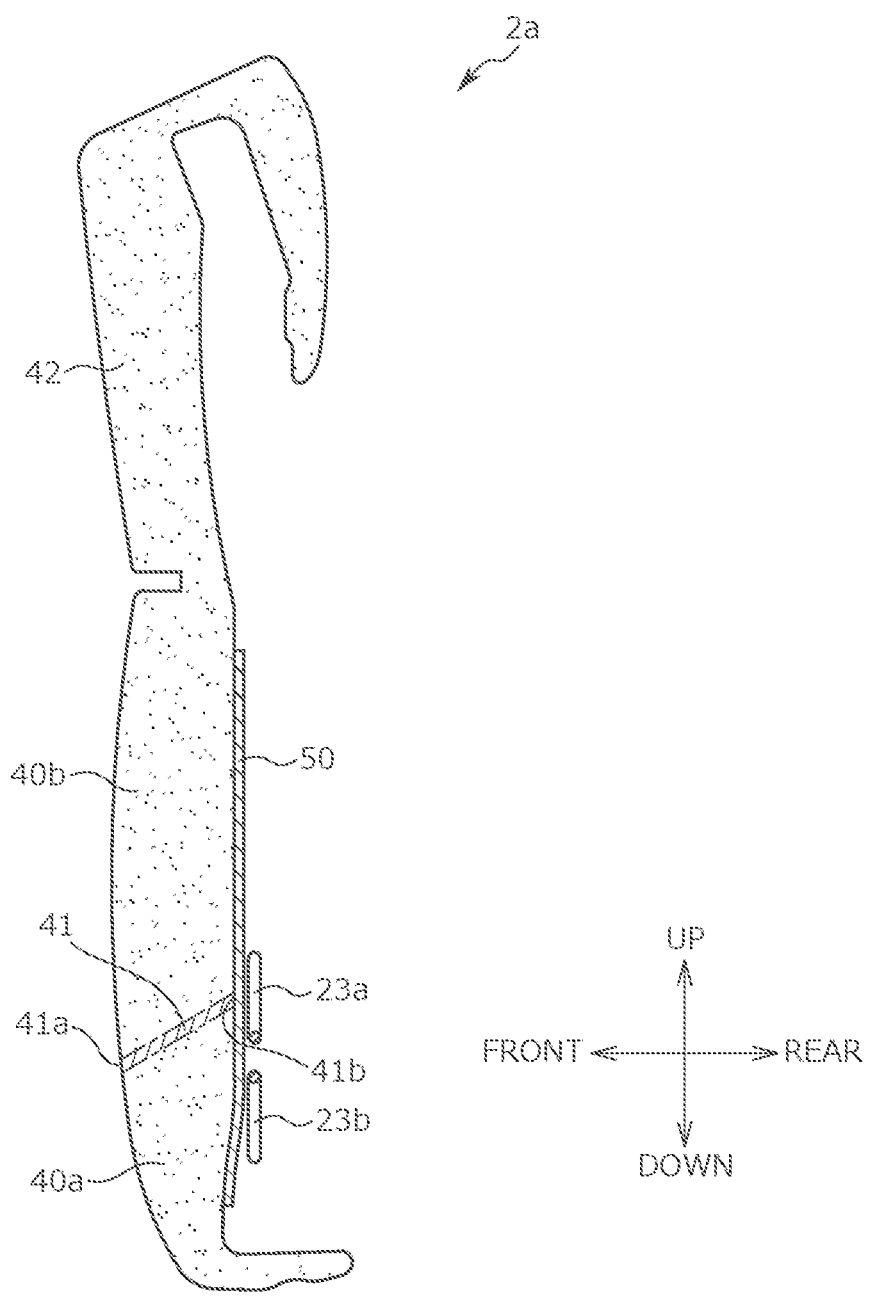
FIG. 10 is a cross-sectional view taken along the line V-V of a seat back pad according to a second modified example.

FIG. 10 is a cross-sectional view taken along the line V-V of the seat back pad 2a according to a second modified example. As illustrated in FIG. 10, in the seat back pad 2a according to the second modified example, the front end portion 41a and the rear end portion 41b of the boundary portion 41 are located at different heights in the up and down direction of the seat and the connection surface between the front end portion 41a and the rear end portion 41b forms a gradient structure. In other words, the front end portion 41a and the rear end portion 41b are connected to each other in a gradient structure. Additionally, the front end portion 41a is located between the S spring 23a and the S spring 23b in the up and down direction of the seat and the rear end portion 41b is located at a position overlapping the S spring 23a in the up and down direction of the seat. Further, the boundary portion 41 illustrated in FIG. 10 may be formed as an impregnation layer or a joint.

In this way, the boundary portion 41 is formed in a gradient structure in which the heights of the front end portion 41a and the rear end portion 41b in the up and down direction of the seat are different and one end portion (in this example, the rear end portion 41b) faces the S spring 23a. Accordingly, since a change in hardness between the boundary portion 41 and the periphery thereof in the seat back pad 2a is smooth, it is possible to suppress an abrupt change in hardness between the boundary portion and the periphery thereof. Accordingly, it is possible to reduce a change in hardness in the periphery of the boundary portion 41.

Figure 11:
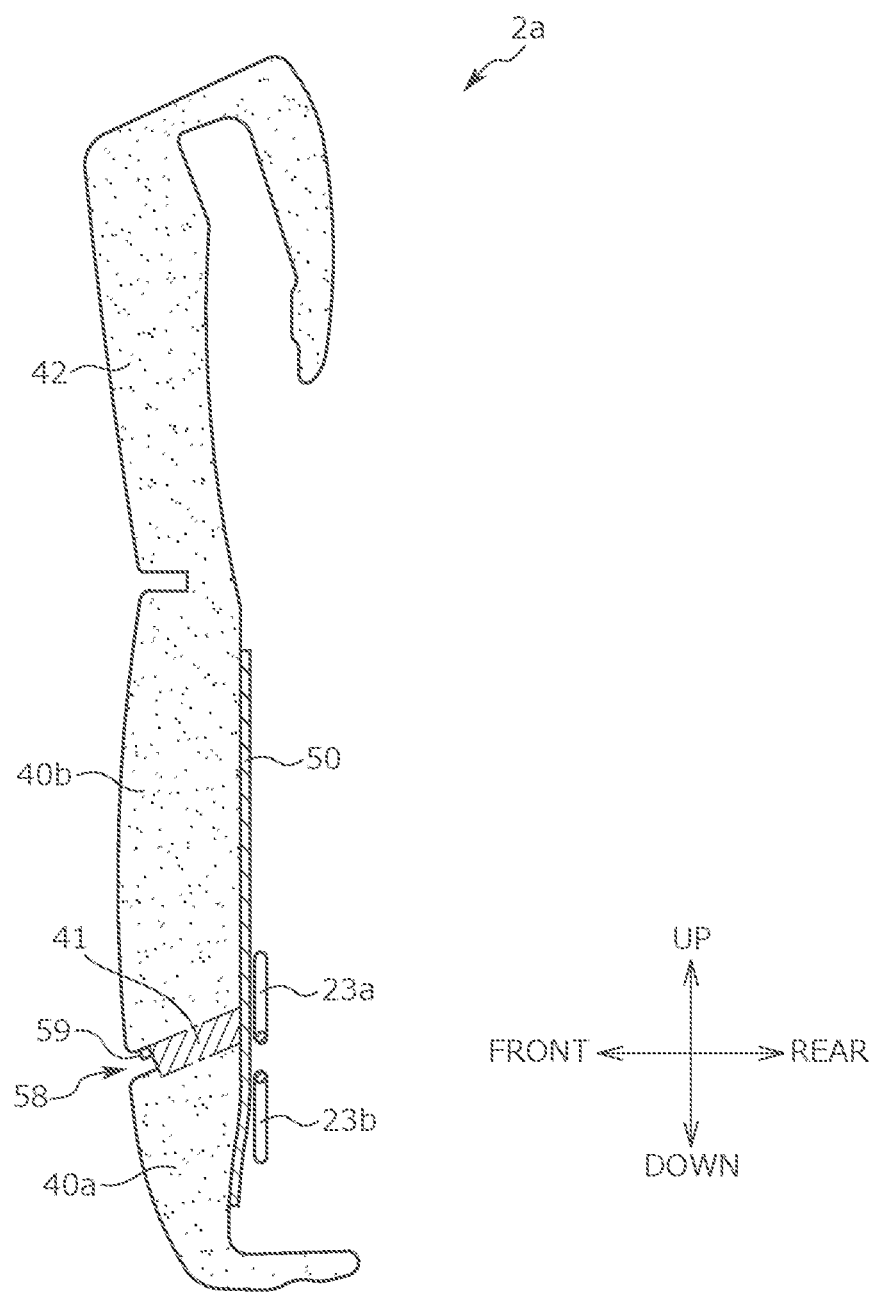
FIG. 11 is a cross-sectional view taken along the line V-V of a seat back pad according to a third modified example.

FIG. 11 is a cross-sectional view taken along the line V-V of the seat back pad 2a according to a third modified example. As illustrated in FIG. 11, in the seat back pad 2a according to the third modified example, the boundary portion 41 is formed in the same gradient structure as that of the second modified example, but is different from the second modified example in the following points. That is, the third modified example is different from the second modified example in that a groove portion 58 is provided in a portion of the front end portion 41a of the boundary portion 41 and a suspending portion 59 such as a suspending wire for suspending a skin material is provided in the groove portion 58.

In this way, also in the third modified example, similarly to the second modified example, the boundary portion 41 is formed in a gradient structure in which the heights of the front end portion 41a and the rear end portion 41b in the up and down direction of the seat are different and one end portion (in this example, the rear end portion 41b) faces the S spring 23a. Accordingly, since a change in hardness between the boundary portion 41 and the periphery thereof in the seat back pad 2a is smooth, it is possible to suppress an abrupt change in hardness between the boundary portion and the periphery thereof. Accordingly, it is possible to reduce a change in hardness in the periphery of the boundary portion 41. Further, in the third modified example, since the groove portion 58 is provided at the front side of the boundary portion 41 and the occupant does not contact the boundary portion 41, it is possible to reduce the uncomfortable feeling of the occupant at the boundary portion 41.

Additionally, in the first to third modified examples, the front end portion 41a is disposed between the S spring 23a and the S spring 23b and the rear end portion 41b is disposed at a position overlapping the S spring 23a in the up and down direction. However, the front end portion 41a may be disposed at a position overlapping the S spring 23a or the S spring 23b in the up and down direction and the rear end portion 41b may be disposed between the S spring 23a and the S spring 23b.

Figure 12:
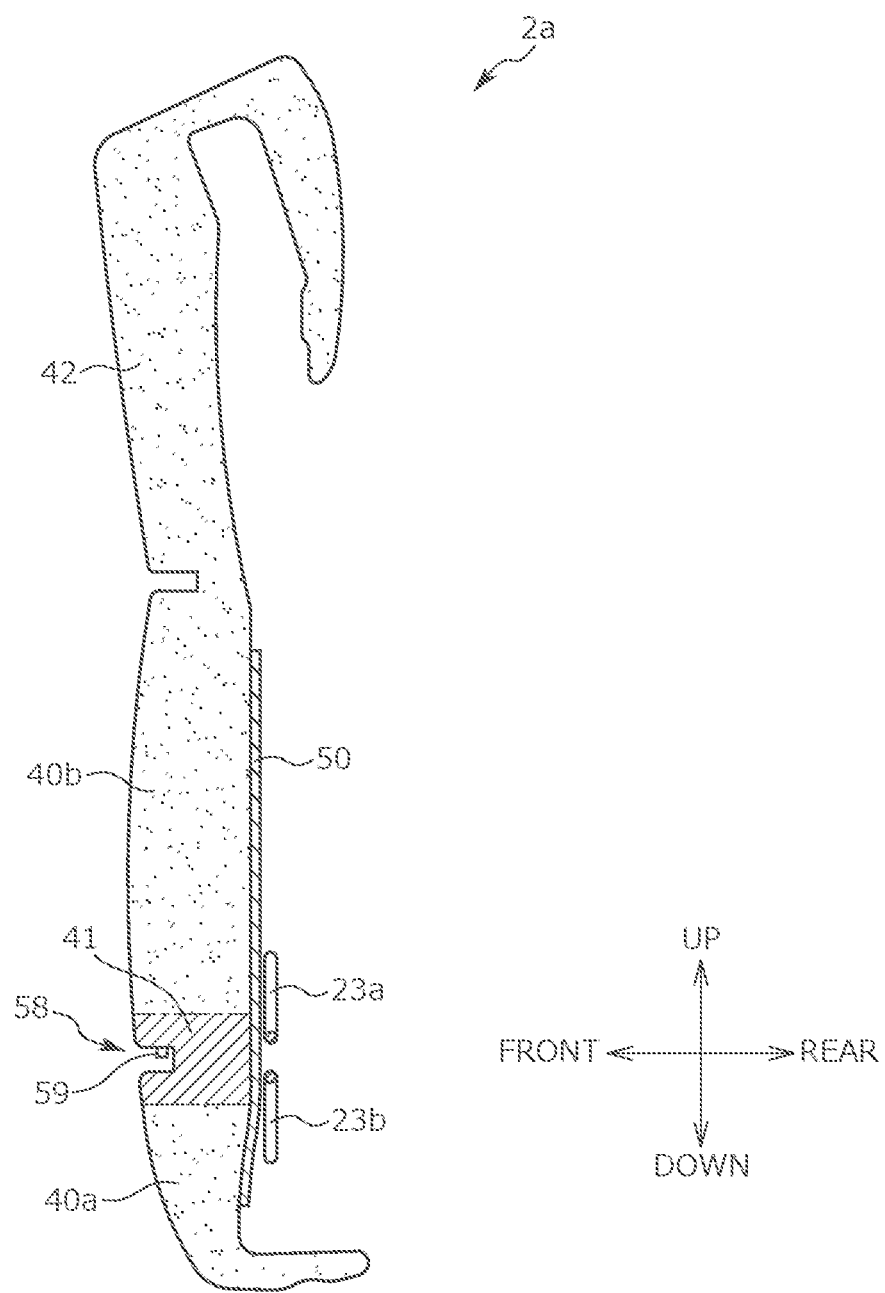
FIG. 12 is a cross-sectional view taken along the line V-V of a seat back pad according to a fourth modified example.

FIG. 12 is a cross-sectional view taken along the line V-V of the seat back pad 2a according to a fourth modified example. As illustrated in FIG. 12, in the seat back pad 2a according to the fourth modified example, the boundary portion 41 is formed in a structure provided with the same groove portion 58 as that of the third modified example, but is different from the third modified example in the following points. That is, the fourth modified example is different from the third modified example in that the boundary portion 41 is formed as a compatible portion in which the material of the first lower cushion region 40a and the material of the second lower cushion region 40b are compatible.

In this way, in the fourth modified example, since the boundary portion 41 faces the S spring 23a so that a change in hardness between the boundary portion 41 and the periphery thereof in the seat back pad 2a is smooth, it is possible to suppress an abrupt change in hardness between the boundary portion and the periphery thereof. Further, since the load input region of the boundary portion 41 is set to be large by forming the boundary portion 41 as the compatible portion, it is possible to reduce an uncomfortable feeling of the occupant at the boundary portion 41. Further, in the fourth modified example, the skin material can be suspended in the suspending portion 59 provided in the groove portion 58 provided at the boundary portion 41. Accordingly, since the slack of the skin material at the boundary portion 41 is prevented, an uncomfortable feeling at the boundary portion 41 can be reduced.

Figure 13:
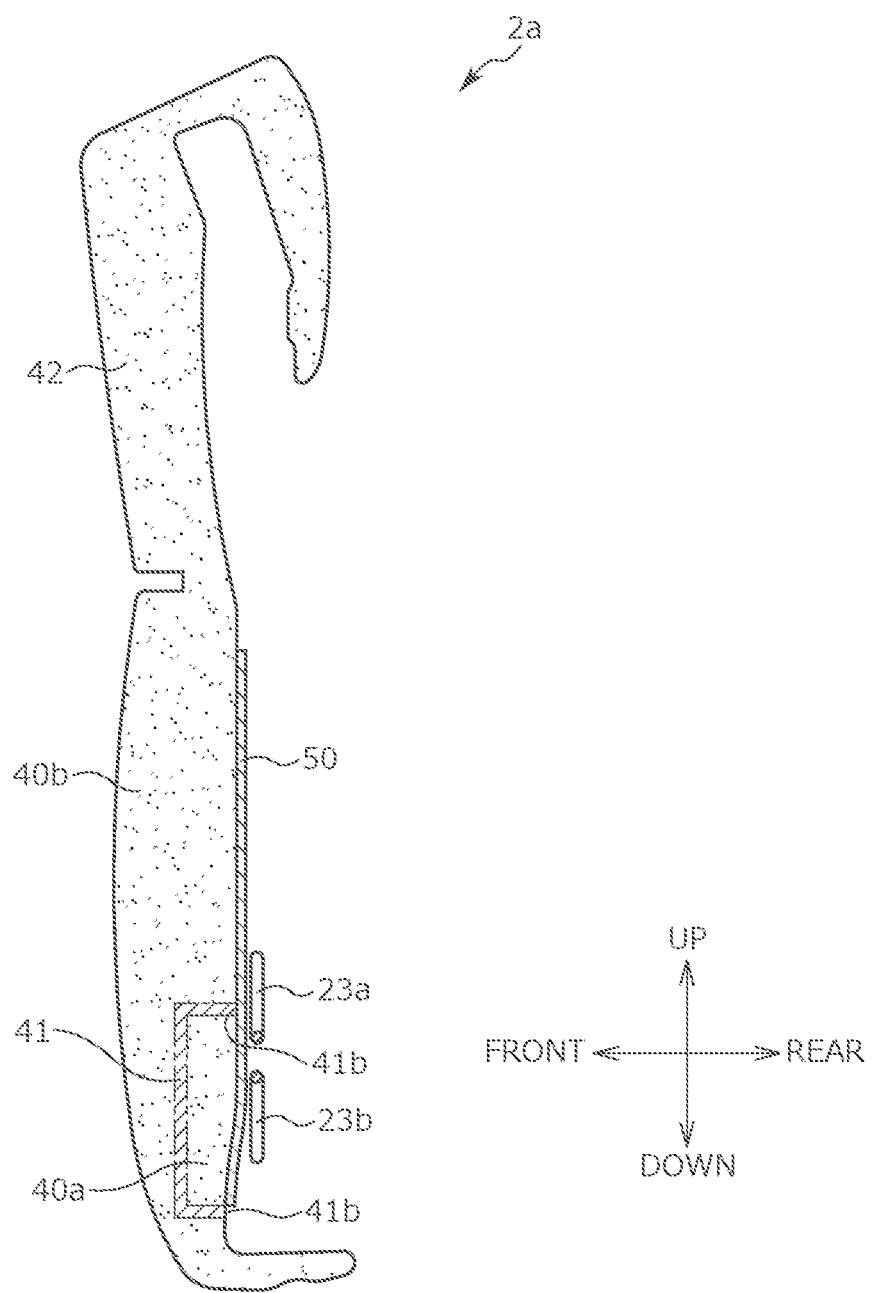
FIG. 13 is a cross-sectional view taken along the line V-V of a seat back pad according to a fifth modified example.

FIG. 13 is a cross-sectional view taken along the line V-V of the seat back pad 2a according to a fifth modified example. As illustrated in FIG. 13, in the seat back pad 2a according to the fifth modified example, each surface excluding the rear surface (the seat rear surface) of the first lower cushion region 40a is covered with the second lower cushion region 40b. Then, the boundary portion 41 between the first lower cushion region 40a and the second lower cushion region 40b does not reach the front surface of the seat back pad 2a. In the example illustrated in FIG. 13, at least one of the rear end portion 41b of the boundary portion 41 is provided at a position facing the S spring 23a. In the example illustrated in FIG. 13, the rear end portion 41b below the boundary portion 41 is located below the S spring 23b, but the rear end portion 41b may be provided at a position facing the S spring 23b.

Further, in the example illustrated in FIG. 13, each surface excluding the rear surface of the first lower cushion region 40a is covered with the second lower cushion region 40b, but each surface excluding the front surface of the first lower cushion region 40a may be covered with the second lower cushion region 40b so that the boundary portion 41 does not reach the rear surface of the seat back pad 2a.

Figure 14:
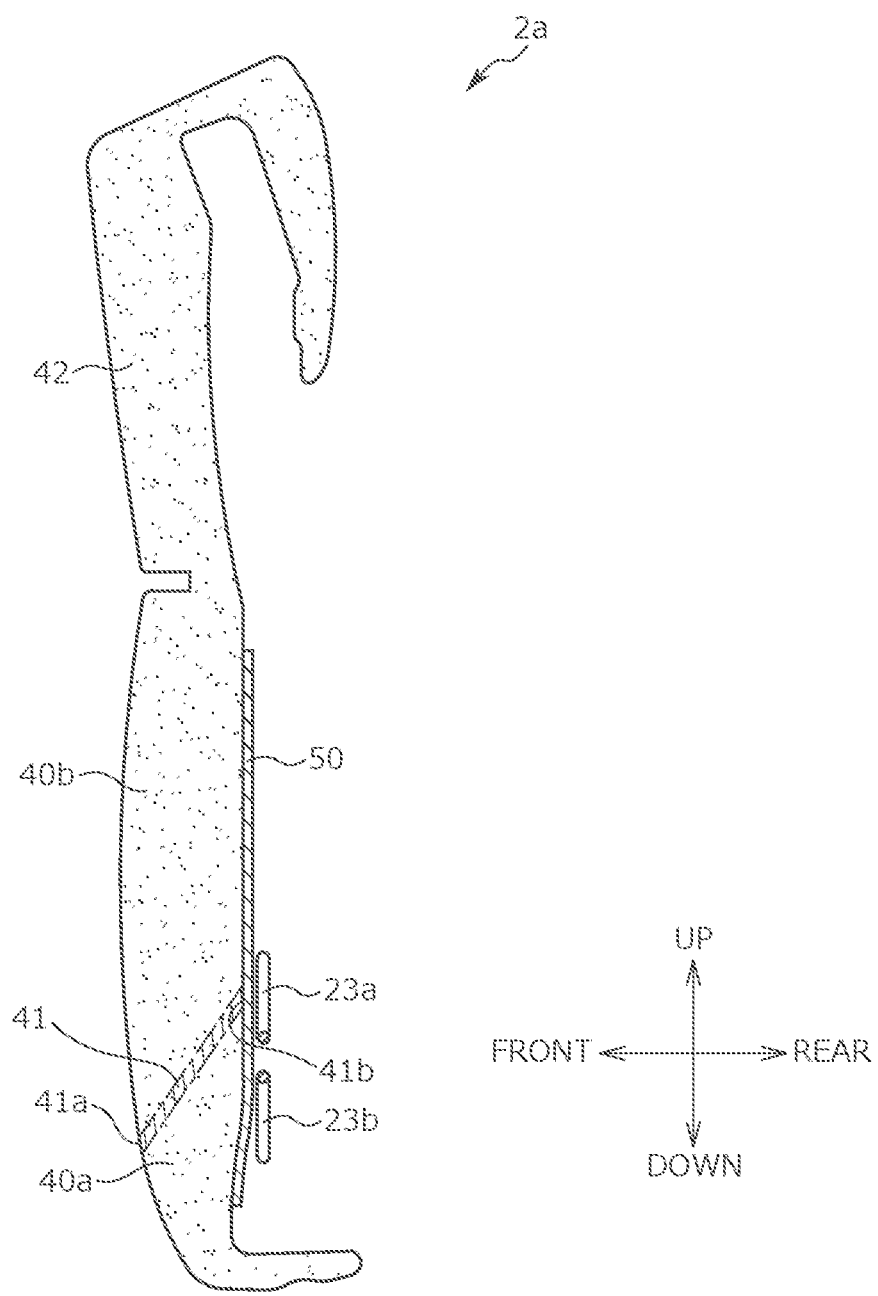
FIG. 14 is a cross-sectional view taken along the line V-V of a seat back pad according to a sixth modified example.

FIG. 14 is a cross-sectional view taken along the line V-V of the seat back pad 2a according to a sixth modified example. As illustrated in FIG. 14, in the seat back pad 2a according to the sixth modified example, the front end portion 41a of the boundary portion 41 between the first lower cushion region 40a and the second lower cushion region 40b is provided at a position facing the S spring 23b and the rear end portion 41b is provided at a position facing the S spring 23a. Further, the present disclosure is not limited to the example illustrated in FIG. 14. The front end portion 41a of the boundary portion 41 may be provided at a position facing the S spring 23a and the rear end portion 41b may be provided at a position facing the S spring 23b.

Additionally, the above-described configurations of the first to sixth modified examples may similarly be applied to the boundary portion 61 of the seat cushion pad 1a.

TABLE OF REFERENCE NUMERALS

S: vehicle seat
Sa: seat frame
1: seat cushion
1a: seat cushion pad
1b: skin
2: seat back
2a: seat back pad
2b: skin
3: headrest
3a: headrest pad
3b: skin
10: cushion frame
11: cushion side frame
12: pan frame
13: frame connection pipe
14a, 14b: S spring (pressure receiving member)
15: reclining mechanism
16: connection shaft
17: spiral spring
18: spring locking member
18a: bent portion
20: seat back frame
21: upper frame
22: side frame
22a: front bent portion
22b: rear bent portion
22c: concave portion
23a, 23b: S spring (pressure receiving member)
30: lower frame
31: frame main body portion
32: frame bent portion
33a: upper end flange portion
33b: lower end flange portion
38: fastening bolt
40: lower cushion region
40a: first lower cushion region
40b: second lower cushion region
41: boundary portion
41a: front end portion
41b: rear end portion
42: upper cushion region
44: right cushion region
46: left cushion region
48: groove portion
50: press felt
52: headrest penetration hole
54, 56: suspending wire TABLE OF REFERENCE NUMERALS -continued 58: groove portion
59: suspending portion
60: front cushion region
60a: first front cushion region (first pad portion)
60b: second front cushion region (second pad portion)
61: boundary portion
61a: upper end portion
61b: lower end portion
62: rear cushion region
64: right cushion region
66: left cushion region
68: groove portion

The invention claimed is:

1. A vehicle seat comprising:
a seat cushion frame;
a seat cushion pad that is placed on the seat cushion frame; and
a pressure receiving member that supports the seat cushion pad and extends in a seat width direction,
wherein:
the seat cushion pad includes a first pad portion that is disposed at a position facing a rear end portion of the pressure receiving member, a second pad portion that is disposed at a position facing a front end portion of the pressure receiving member, and a boundary portion that is a boundary between the first pad portion and the second pad portion;
a hardness of the first pad portion is greater than a hardness of the second pad portion;
the first pad portion is an ischial tuberosity support region that is configured to support an ischial tuberosity of an occupant;
the boundary portion is disposed in front of the ischial tuberosity support region; and
the boundary portion is formed in a wavy shape when the vehicle seat is viewed from above.

2. The vehicle seat according to claim 1, wherein:
a press felt is adhered to back surfaces of the first pad portion and the second pad portion; and
the press felt is disposed at a position that overlaps the boundary portion in an up and down direction of the vehicle seat.

3. The vehicle seat according to claim 1,
wherein an upper end portion of the boundary portion on an upper side of the vehicle seat and a lower end portion of the boundary portion on a lower side of the vehicle seat are located at different positions in a front to back direction of the seat.

4. The vehicle seat according to claim 3,
wherein a connection surface between the upper end portion and the lower end portion is formed in a stepped structure.

5. The vehicle seat according to claim 3,
wherein the connection surface between the upper end portion and the lower end portion is formed in a gradient structure.

6. The vehicle seat according to claim 1,
wherein the boundary portion is a compatible portion in which the materials of the plurality of regions are compatible.

* * * * *